Nov. 9, 1943.  J. F. DWIGGINS  2,333,711
OIL LEVEL GAUGE
Filed April 15, 1942
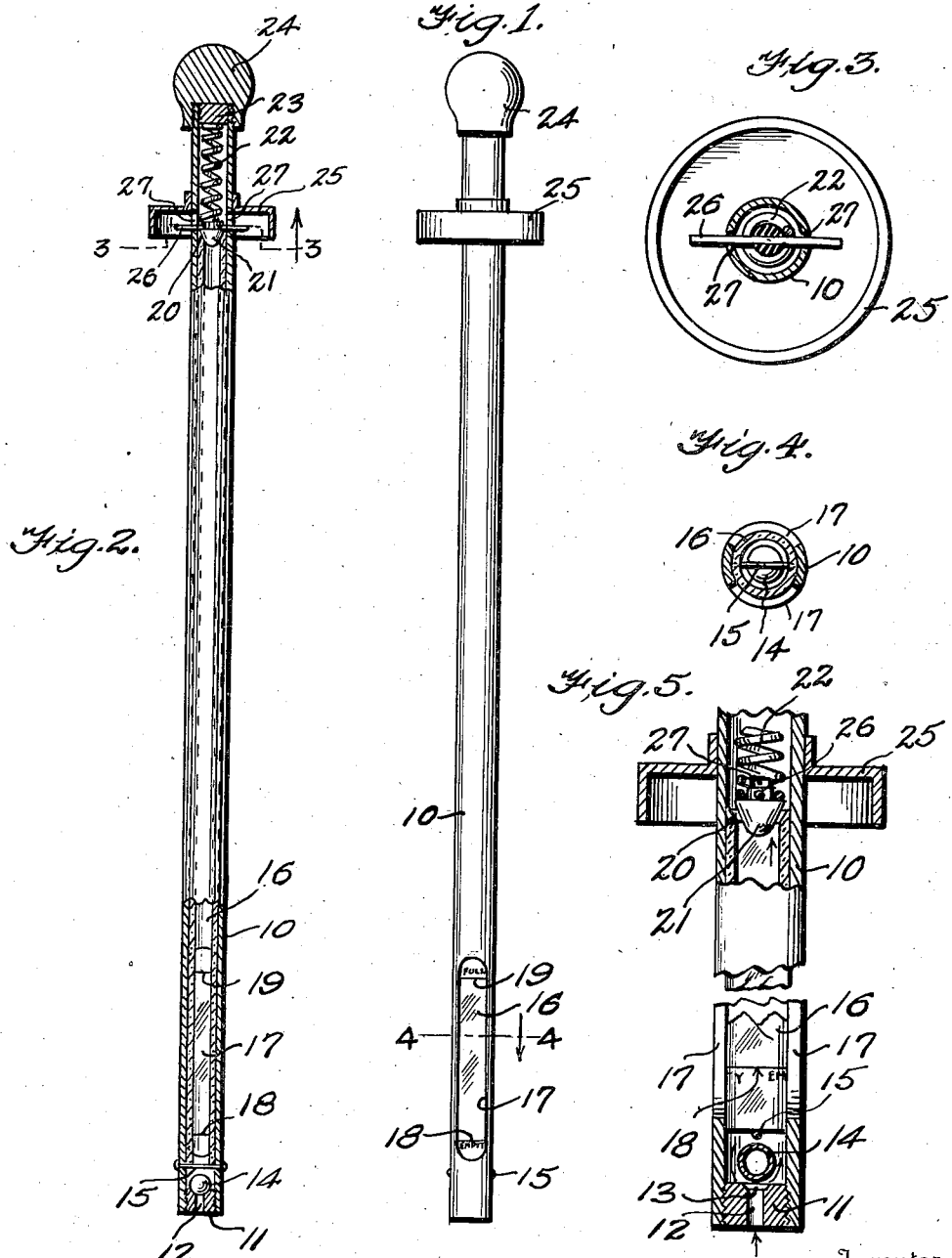
Inventor
JOHN F. DWIGGINS Patented Nov. 9, 1943

2,333,711

UNITED STATES PATENT OFFICE 2,333,711

OIL LEVEL GAUGE

John F. Dwiggins, Atlanta, Ga.

Application April 15, 1942, Serial No. 439,111

2 Claims. (Cl. 33—126.7)

This invention relates to oil level gauges for automobiles and the like, and has for one of its objects the production of a simple and efficient means for facilitating the measuring of the oil level within a crank case of an engine.

A further object of this invention is the production of a simple and efficient means for trapping oil within a hollow tube when inserting the tube in the gauge opening of an engine, so that the oil will retain its level in the tube after the tube is removed for inspection, to ascertain the height of the oil within the crank case of an engine.

Other objects and advantages of the present invention will appear throughout the following specification and claims.

In the drawing:

Figure 1 is a side elevational view of the gauge;

Figure 2 is a vertical sectional view, a portion of the tube being shown in side elevation;

Figure 3 is a horizontal sectional view taken on line 3—3 of Figure 2;

Figure 4 is a horizontal sectional view taken on line 4—4 of Figure 1;

Figure 5 is an enlarged fragmentary vertical sectional view of the gauge taken at right angles to the section shown in Figure 2.

By referring to the drawing, it will be seen that 10 designates the tube or outer tubular metal or other shield which constitutes an outer protector casing for the level gauge. A plug 11 is threaded into the lower end of the shield 10. This plug 11 is provided with an oil entrance port 12 and a valve seat 13 is formed at the inner end of the port 12, as shown in the enlarged view Figure 5. A hollow floating ball check 14 is adapted to normally rest upon the seat 13, and is adapted to be floated off the seat 13 when oil passes up through the port 12 while entering the gauge. A transverse stop pin 15 may be provided above the ball check 14 to limit the upward movement of the check 14 and to confine the check 14 in the vicinity of the seat 13 where it may promptly fall upon the seat 13 when the gauge is removed from the gauge opening of an engine.

A glass or other transparent lining 16 is fitted within the shield or tube 10, and the tube 10 is cut out, as at 17, to provide a window, or windows through which the level of the oil within the gauge may be observed. The portion of the lining 16 which may be viewed through the window 17 is marked with a gauge line 18 indicating "empty," and a gauge line 19 indicating "full."

The upper end of the lining 16 constitutes a valve seat 20 for the tapering synthetic rubber plug 21, which plug is engaged and normally retained on the seat 20 by means of an expansion coil spring 22. The opposite end of the spring 22 abuts against the top plug 23, which plug 23 closes the upper end of the tube 10. A knob 24 is also carried by the upper end of the tube 10 to facilitate placing the gauge within a gauge opening or removing the gauge therefrom. An inverted cup-shaped stop or cap 25 is carried near the upper end of the gauge and a transverse pin 26 is carried by the plug 21. This pin 26 passes through the apertures 27 formed in the tube 10 and abuts against the bottom face of the stop or cap 25 to limit the upward movement of the plug 21.

It should be understood that the present device provides an efficient visual check on the condition of the oil in the crank case of an engine.

From the foregoing description it will be noted that the oil level gauge which is used for automobiles and the like for testing the amount of oil within the engine, comprises a metal shielded glass tube having a spring-pressed synthetic rubber plug at its upper end, the lower end of the tube having a small oil inlet opening to compensate for the changes in viscosity due to heating. A window is provided in the lower end of the tube for the purpose of observing the oil level within the tube.

When the gauge is inserted in the gauge opening of the engine casing, the rubber plug 21 at the upper end of the tube is forced off its seat, and the pin 26 is forced against the lower face of the shield cap 25. This action allows oil to enter through the port 12 at the lower end of the tube until the oil within the tube reaches the same level as that within the engine. When the gauge is withdrawn from the engine, the rubber valve 21 automatically seats upon the seat 21 and the oil within the tube is held in the gauge at its original level by means of the spring 22, and in this way the oil level in the engine can be observed after the gauge has been removed from the engine. I also provide a float ball valve 14 at the lower end of the tube to act as an additional check to prevent seepage of oil from the lower end of the tube, and while it is advisable to use this float valve 14, it is possible that the device may operate without the ball 14.

The shield cap 25 is positioned so as to overhang the pin 26, which pin works within the cap 25 and the purpose of this shield is to prevent the service station attendant from manipulating the check valve. The cap 25 is adapted to fit snugly over the upper end of the oil test tube of the engine.

In addition to acting as a shield to prevent manipulation of the valve by service station attendants, the cap 25 limits the depth of immersion and constitutes a stop for the gauge and also acts as a stop for the upper valve 21.

Having described the invention, what I claim is:

1. An oil level gauge of the class described comprising a hollow tube having an oil entrance opening at its lower end, a spring-pressed valve carried by the opposite upper end of said tube and adapted to normally close the upper end thereof, means carried by said valve and projecting laterally of the tube and adapted to overhang the edge of the gauge opening of an engine and the like for automatically moving said valve to an open position as said tube is inserted into a gauge opening to provide a vent and to permit liquid to flow into said tube through the oil entrance opening, and said valve being adapted to automatically close to retain liquid within said tube when the tube is removed from the gauge opening.

2. An oil level gauge of the class described comprising a hollow tube having an oil entrance opening at its lower end, a spring-pressed valve carried by the opposite upper end of said tube and adapted to normally close the upper end thereof, a transversely extending pin carried by the valve and projecting laterally of the valve and also projecting laterally of the tube in a manner whereby said pin will contact with the outer end of an oil filling pipe of an engine and the like as the tube is inserted into an oil filling pipe for measuring the oil therein and will automatically move said valve to an open position as the tube is inserted into said pipe to permit oil to pass through the oil entrance opening and into said pipe, the valve being adapted to automatically close when the tube is withdrawn from the oil filling pipe and pressure is released from the pin, thereby sealing the upper end of the tube and retaining the oil within the tube, means carried by the tube for facilitating the measuring of the oil retained within the tube, and a shielding cap overhanging said pin and preventing the manipulation of the pin when the tube is inserted in a measuring position within an oil filling pipe.

JOHN F. DWIGGINS.